United States Patent
Weiss

[15] 3,683,778
[45] Aug. 15, 1972

[54] PHOTOGRAPHIC SHUTTER

[72] Inventor: Hugo Weiss, Atterseestrasse 6, 8 Munich 60, Germany

[22] Filed: May 13, 1970

[21] Appl. No.: 36,897

[30] Foreign Application Priority Data

May 28, 1969 Germany..........P 19 27 158.0

[52] U.S. Cl. ..................................................95/60
[51] Int. Cl. ...............................................G03b 9/20
[58] Field of Search......................95/53 R, 58, 59, 60

[56] References Cited

UNITED STATES PATENTS 3,580,156   5/1971   Loseries........................95/60
3,479,946   11/1969   Bohm...........................95/60

Primary Examiner—Samuel S. Matthews
Assistant Examiner—Russell E. Adams, Jr.
Attorney—Charles Shepard and Stonebraker & Shepard

[57] ABSTRACT

A photographic shutter having one set of blades, pivoted for fanwise movement on a common pivot, for opening the exposure aperture, and a second set of blades, also pivoted for fanwise movement, for closing the exposure aperture. Each set of blades is operated by its own operating lever, and both operating levers are driven by the same driving element which, in turn, is driven by a main driving member or master member.

7 Claims, 6 Drawing Figures

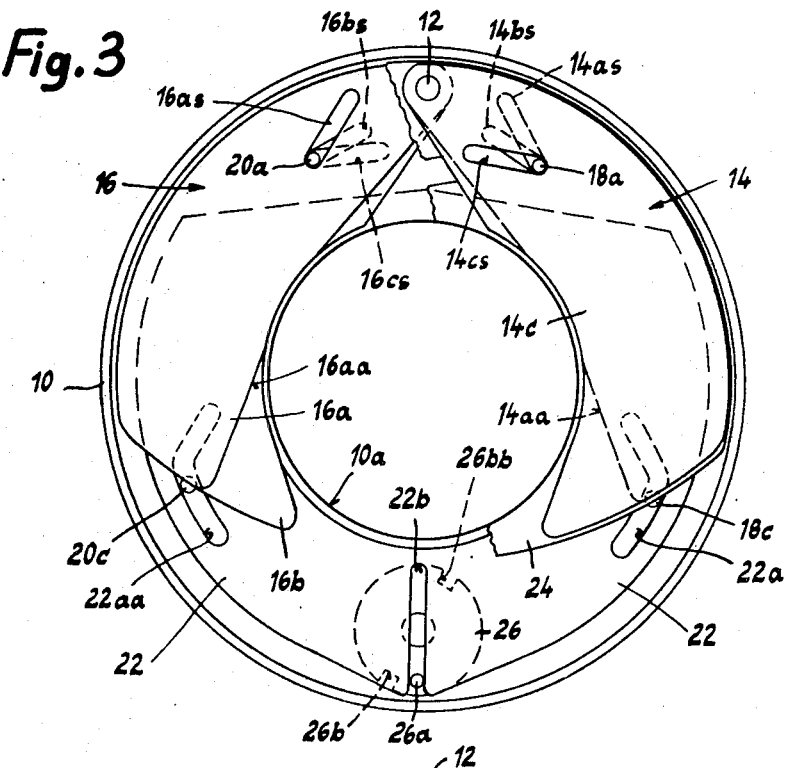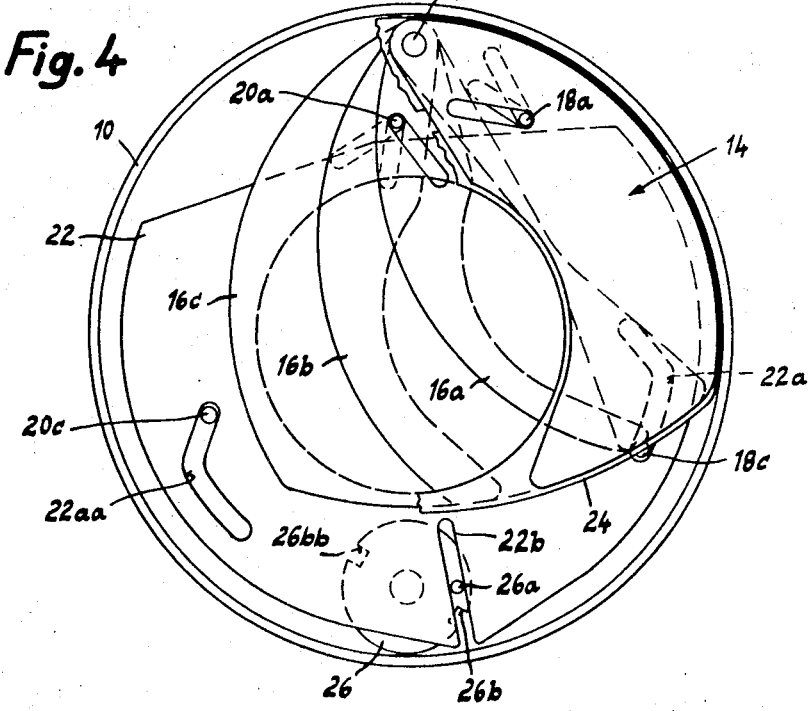

PHOTOGRAPHIC SHUTTER

BACKGROUND OF THE INVENTION

In most of the modern and currently used photographic shutters, there are several blades, each pivoted on its own individual pivot, usually mounted in an annular casing or housing and operated by a blade ring which rotates concentrically with the exposure aperture at the center of the housing. As distinguished from this usual construction, the present construction provides a set or series of blades mounted for fanwise swinging on a single or common pivot, from a closed position extending across the exposure aperture to an open position allowing light to pass through the exposure aperture, and a second set of blades similarly mounted for fanwise swinging movement on a common pivot, from an open position permitting passage of light through the exposure aperture (when it has been uncovered by opening of the first set of blades) to a closed position obstructing passage of light. The second set of blades may be mounted to swing on the same pivot as that of the first set of blades.

When an exposure is to be made, a main driving member or master member moves a driving element, which may be in the form of a rotatable ring, from one extreme or end position to another extreme or end position. This movement of the driving element serves, through intermediate members such as levers, to move the previously closed set of blades from a fanned out position to a collapsed position, thereby opening the exposure aperture and initiating the exposure, and subsequently moves the other set of blades from a collapsed position to a fanned out position, thereby closing the exposure aperture and terminating the exposure. For the next exposure, the procedure is reversed, the second set of blades which constituted the closing set of blades in the previous exposure now becoming the opening set of blades, while the other set which previously constituted the opening set in the previous exposure, now constitutes the closing set of blades.

It is an object of the present invention to provide a shutter which has a comparatively large exposure aperture or light aperture in comparison to the external dimensions of the shutter housing.

Another object is the provision of a shutter in which all of the movable parts or elements move in a single direction only, during the making of a single exposure, avoiding any reversal of movement and thereby facilitating the making of exposures with very short exposure times or high speed.

Still another object is the provision of a shutter so designed as to have relatively few parts, of simple construction, easy and inexpensive to manufacture and to assemble, the parts being so shaped that they may be accommodated within a comparatively small casing or housing.

BRIEF DESCRIPTION OF THE DRAWINGS

FIG. 3 is a similar view showing the parts in an intermediate position during the making of an exposure, with both sets of blades open so that light may pass through the exposure aperture;

FIG. 4 is a similar view showing the parts at the conclusion of an exposure cycle, with the first set of blades now collapsed to a non-obstructing position and with the second set of blades fanned out to close the aperture;

DESCRIPTION OF THE PREFERRED EMBODIMENT

Figure 1:
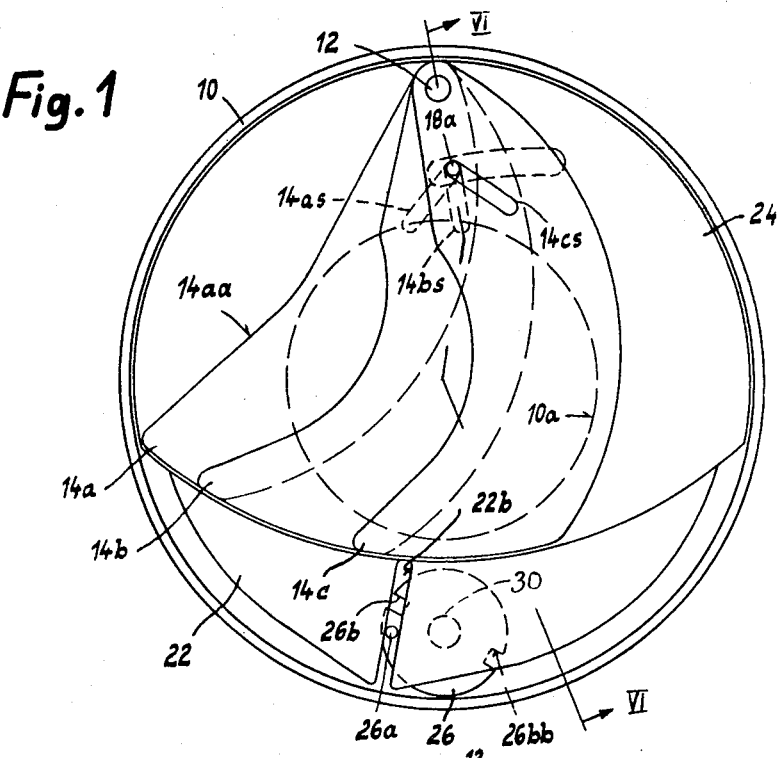
FIG. 1 is a front face view of a shutter according to a preferred embodiment of the invention, with the front cover plate removed to show the interior construction, illustrating the first set of shutter blades in fanned out position extending across and closing the exposure aperture, the second set of shutter blades and various other parts being omitted for the sake of clarity.

In the preferred embodiment, the shutter has a casing or housing of the usual annular form, indicated in general at 10 and having a central exposure aperture or light-admitting aperture 10a. Fixed in the housing is a bearing pin or pivot pin 12 which serves as the common pivotal axis for all of the blades of two separate fan-type shutter systems or blade groups 14 and 16. Each system or group comprises three shutter blades 14a, 14b, 14c in the first group, 16a, 16b, and 16c in the second group. In each case only one of the blades, namely 14a and 16a, has an edge 14aa and 16aa, respectively, which completely spans or sweeps completely across the width of the exposure aperture during the opening and closing movements of the blades. The other blades of each group serve merely as supplementary or cover blades for closing that part of the area of the exposure aperture 10a which is not closed by the primary blade 14a or 16a, respectively, when the primary blade is in aperture obstructing position.

It should be understood that the blades operate somewhat like the blades of a lady's collapsible fan. When they are fully collapsed, the blades of each set overlie each other, entirely in the annular space within the housing, around the central exposure aperture 10a, the blades of the first group 14 lying to the right of the exposure aperture as seen in FIG. 3, and the blades of the second group 16 lying to the left of the aperture. This position shown in FIG. 3, with both blades in the annular space, occurs only during the making of an exposure. Normally, in the rest position, one group of blades is collapsed to lie within the annular space, and the other group of blades is extended or expanded so as to lie across the exposure aperture 10a and prevent passage of light therethrough.

Figure 2:
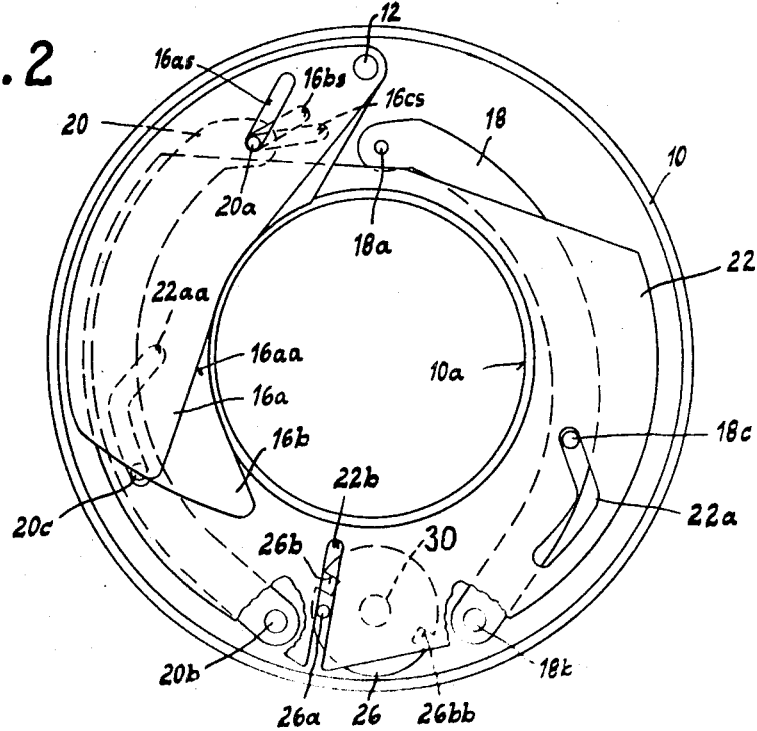
FIG. 2 is a similar view with the first set of shutter blades and other parts omitted, and with the second set of shutter blades shown in collapsed or folded position so as not to obstruct the exposure aperture.

Each blade has a control slot. The slots in the blades of the first group or set are designated respectively at 14as, 14bs, and 14cs, while those in the blades of the second group or set are designated at 16as, 16bs, and 16cs. A control pin 18a on an operating lever 18 engages in the control slots of the blades of the first group, and a similar control pin 20a on a second control lever 20 engages in the slots of the blades of the second group or set 16. The control pins 18a and 20a may also be referred to as entraining means, since they entrain the baldes by engagement in the control slots of the blades, which slots may also be called operating slots or operating means. As best seen in FIG. 2, these control levers 18 and 20 are mounted on separate pivots 18b and 20b in the housing. Both levers, as shown, are curved so as not to obstruct the exposure aperture in any position of the lever, the pivot pin 18b or 20b respectively being near one end of its lever, and the control pin 18a and 20a, respectively, being substantially at the other end of the control lever.

Figure 6:
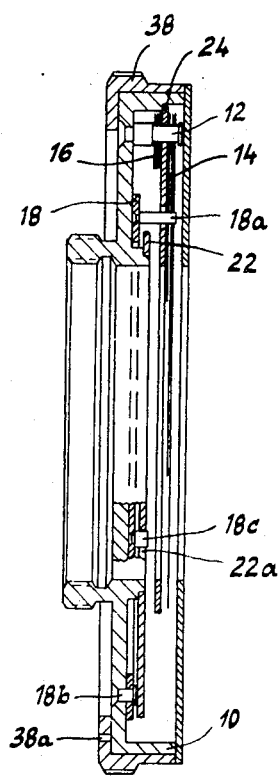
FIG. 6 is an axial cross section taken diametrically through the shutter approximately on the line VI—VI of FIG. 1.

Both control levers are actuated by a driving element in the form of a ring 22 extending circumferentially around the exposure aperture 10a and rotatable concentrically therewith. The driving ring contains operating means in the form of two actuating slots, 22a and 22aa in which are respectively engaged an actuating pin 18c on the operating lever 18 and an actuating pin 20c on the operating lever 20. These pins constitute entraining means for operatively connecting the levers 18 and 20 to the operating means 22a and 22aa of the driving element 22. Each of the actuating slots has a dwell portion concentric with the axis of rotation of the driving ring 22, and another or cam-rise portion which is oblique or cam-like, having a radial component or rise as well as a circumferential component. When the respective actuating pin is in the concentric or dwell portion of the actuating slot, circumferential movement of the ring 22 will not move the resepective pin and therefore will not cause any swinging movement of the respective operating lever 18 or 20. But when the actuating pin is in the oblique or cam-rise portion of the actuating slot, rotation of the ring 22 will cause a swinging movement of the respective lever 18 or 20. This will cause movement of the resepctive control pin 18a or 20a, and the movement of this control pin will, in turn, cause the respective shutter blades 14 or 16 to swing. The levers 18 and 20 thus constitute intermediate means interposed between the driving element 22 and the blade systems, for operating the blade systems from the driving element. A thin interplate 24 (FIG. 6) with a central opening corresponding to the exposure aperture 10a is interposed between the two blade systems 14 and 16, to insure that the blades of one group do not interfere with the blades of the other group when they perform their swinging movements. The blades 14 are located in front of the plate 24, and the blade 16 behind the plate 24, between it and the driving ring 22.

The driving ring 22 is operated by a main driving member or master member 26 rotatably mounted on the forward end 30a of a tensioning or cocking spindle 30 which extends out through the back wall of the shutter housing and into the associated camera (not shown) so as to be operated by mechanism within the camera. The driving member 26 has an eccentric driving pin 26a engaging in a driving slot 22b formed radially in the driving ring 22. The pin 26a thus acts as a crank pin. As the driving member 26 turns through one-half a revolution, the pin 26a, acting on the slot 22b, will turn the driving ring 22 through its complete range in one direction, from the extreme clockwise position shown in FIGS. 1 and 2 to the extreme counterclockwise position shown in FIG. 4. Then during the next half revolution (the driving member 26 always turning in the same counterclockwise direction) the pin 26a will turn the ring 22 back from its extreme counterclockwise position of FIG. 4, to its extreme clockwise position of FIGS. 1 and 2.

Two notches 26b and 26bb are arranged diametrically opposite each other on the periphery of the driving member 26. A latch or trip lever 28 (FIG. 5) pivotally mounted in the shutter housing, will engage in one or another of these two notches and hold the driving member 26 in one or the other of its two diametrically opposite positions, the latch being spring biased toward latching position.

The main driving member or master member 26 is turned by means of a tensioning disk or cocking disk 34 which is mounted for limited axial movement on the spindle 30 but is non-rotatably coupled thereto by means of a spline 32 or its equivalent, so that the disk 34 must always turn with the spindle 30 regardless of its slight axial movement on the spindle. The disk 34 has a chamfered pin 34a projecting forwardly from the front face of the disk, in position to engage in one or another of the two notches 26b and 26bb of the driving member 26. The disk also has a pin 34b projecting rearwardly from the disk, and serving as an anchor for one end 36a of the main driving spring or master spring 36, which is coiled around the spindle 30. The other end 36b of the driving spring 36 is engaged in an oblique setting slot 38a in the exposure time setting ring or shutter speed setting ring 38 rotatable on the shutter housing and accessible for manual grasping. (See FIG. 6 as well as FIG. 5.) Because of the oblique nature of the slot 38a, rotation of the setting ring 38 in one direction will serve to wind the spring 36 more tightly, to increase the speed of operation of the shutter, while rotation of the setting ring 38 in the opposite direction will relax or slightly unwind the spring 36, resulting in slower operation of the shutter. The setting ring 38 is provided with the usual conventional shutter speed scale graduations, read in conjunction with a suitable index mark.

In addition to the main driving spring 36, there is also another spring (not shown) which urges the disk 34 axially toward the driving member 26, to tend to keep the pin 34a on the driving disk engaged in one or the other of the two notches 26b and 26bb. The rear end 30b of the spindle 30 projects out the rear of the shutter housing, as already mentioned, and is provided with a coupling slot 30c by which the spindle is coupled to conventional tensioning or cocking mechanism within the camera body, which tensioning mechanism is preferably but not necessarily coupled with the film winding or film transport mechanism of the camera, as quite customary.

When the tensioning mechanism of the camera is operated, this turns the spindle 30 clockwise through half a revolution. Assuming that, at the beginning of the tensioning operation, the pin 34a was engaged in the notch 26b, the commencement of clockwise rotation of the spindle 30 and the disk 34 will cause the disk 34 to be displaced axially rearwardly on the spindle, because of the camming action of the oblique or chamfered side of the pin 34a reacting against the side of the notch 26b in the member 26. The member 26 cannot turn at this time, because it is held by the latch 28. At the completion of half a revolution in the clockwise direction, the pin 34a will have moved from the full line position shown in FIG. 5 to the dotted line position shown in FIG. 5, where it will now be opposite the other notch 26bb of the member 26, and it will snap into and seat in this notch 26bb, under the influence of the axial spring above mentioned. The parts are now tensioned or cocked, and ready to drive the member 26 through half a revolution in the counterclockwise direction, when the latch 28 is released. The clockwise rotation of the spindle 30 and disk 34 has served, of course, to tension or wind up the main driving spring 36. At the conclusion of the tensioning movement, the tensioning or cocking lever on the camera is released and returns to its initial rest position in the usual manner, through a ratchet coupling, although the spindle 30 remains in its tensioned position.

Figure 5:
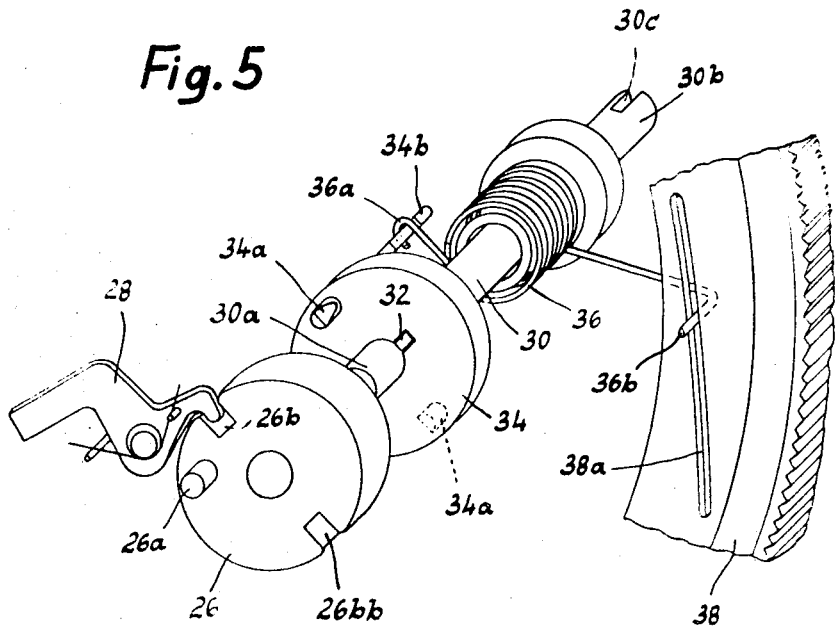
FIG. 5 is a schematic perspective view of the main driving member or master member and certain associated parts including the tensioning or cocking parts.

With the driving member 26 in the position shown in FIGS. 1, 2, and 5, the shutter blades of the first group 14 will be extended or spread out fanwise, fully closing the exposure aperture 10a, as shown in FIG. 1, and the blades of the second group or system 16 will be collapsed or closed up to lie over each other in the left hand side of the annular space in the housing, as shown in FIG. 2, where they do not interfere with passage of light through the exposure aperture. Before making the exposure, the shutter speed setting ring 38 is adjusted to the desired position (either before or after performing the tensioning or cocking operation) and the parts are now ready for the exposure.

The exposure is initiated by operating the trip or release lever 28, to withdraw the nose thereof from the notch 26b of the member 26. The main driving member 26 thus begins to turn in a counterclockwise direction under the action of the spring 36, which acts on the member 26 through the coupling constituted by the parts 34 and 34a. This running down movement continues through half a revolution or 180°, being limited to this extent by a suitable abutment (not shown) in the camera, acting on the tensioning spindle 30.

During the first phase (about 90°) of the running down movement of the main driving member 26 in the counterclockwise direction, the crank pin 26a thereon operates on the driving slot 22b of the driving ring 22 to turn this ring 22 counterclockwise through half of its range of movement, from the position shown in FIGS. 1 and 2 to the position shown in FIG. 3. During this movement, the concentric part of the driving slot 22aa is engaged with the pin 20c of the operating lever 20, so that no movement of this lever takes place, and the blades of the second group or system 16 remain in the same collapsed position shown in FIG. 2. However, during this first half of movement of the driving ring 22 the pin 18c of the operating lever 18 has been in the oblique portion, as distinguished from the concentric portion, of the driving slot 22a, and so this motion of the driving ring has caused the operating lever 18 to swing clockwise from the position shown in FIG. 2, thereby carrying the pin 18a thereof rightwardly from the position in FIGS. 1 and 2 to the position shown in FIG. 3, so that the pin 18a operates on the slots 14as, 14bs, and 14cs of the blade group 14, swinging all of the blades of this group rightwardly to a collapsed position shown in FIG. 3, thereby opening the exposure aperture so that light may enter.

During the second phase (about 90°) of the running down movement of the main driving member 26 in the counterclockwise direction, the crank pin 26a, still operating in the slot 22b, swings the driving ring 22 still further in a counterclockwise direction, from the position shown in FIG. 3 to the position shown in FIG. 4. The pin 18c of the operating lever 18 now rides in the concentric portion of the slot 22a, so that no further movement of the operating lever 18 takes place during this second half of the movement of the ring 22. But the pin 20c of the operating lever 20 is now in the oblique portion, as distinguished from the concentric portion, of the slot 22aa, so that the operating lever 20 is swung clockwise or to the right from its previous position illustrated in FIG. 2, and the pin 20a thereof operates on the slots 16as, 16bs, and 16cs of the blades of the second group or system 16, to swing these blades from the collapsed position shown in FIGS. 2 and 3, to the unfolded or extended position shown in FIG. 4, extending across and closing the exposure aperture to terminate the exposure. At the conclusion of the running down movement, the nose of the trip or release latch 28 now rests in the second notch 26bb of the driving member 26, and the pin 34a likewise is in this notch 26bb.

The two driving slots 22a and 22aa of the driving ring 22 may be so dimensioned with respect to each other that there is a slight time lag after completion of the opening movement of one set of shutter blades, before the other set begins to close, so that both sets remain simultaneously in the open position shown in FIG. 3, during such time lag. The extent of this time lag, if any, will increase the length of the exposure time. A slight time lag is usually preferred. But if desired, the slots 22a and 22aa may be shaped and proportioned to give no time lag whatever, the blades of the second group or system beginning to close just as the blades of the first group or system reach their fully open position, or may even be designed to give what may be called a negative time lag, whereby the blades of the second group begin to close a little before the blades of the first group reach their fully open position. Such a negative time lag is usually not preferred, but may be employed if the shutter is to be used for extremely rapid exposures of short duration.

At the end of the exposure cycle such as described above, it will be apparent that the crank pin 26a of the main driving member 26 will come to rest in the position shown in FIG. 4. It is not necessary to return the parts to initial position, before making the next exposure. The exposure can start from the position shown in FIG. 4 just as well as from the position shown in FIGS. 1 and 2. In other words, if the parts come to rest in the position shown in FIG. 4, the next tensioning movement of the spindle 30 will move the pin 34a out of the notch 26bb and will put it in the notch 26, and the main driving member 26 will now be ready for another running down movement through half a revolution. During this next exposure, the drive member 26 will turn in the counterclockwise direction, just as before, but the blades of the group or system 16 will now constitute the first or opening group of blades, while the blades of the system 14 will now constitute the second or closing group or system. The drive ring 22 will turn in a clockwise direction rather than a counterclockwise direction, during this next exposure, but the movement will be continuous in this direction during the entire running down time of the exposure cycle. The ring will not change direction during the progress of the cycle.

In this way, the two blade systems alternate their functions as opening and closing the systems. They do not perform any reverse movement during any single exposure operation. The main driving member always moves in one direction of rotation from one extreme or limit position to the other extreme or limit position, and the same is true of the driving ring 22. Because of the elimination of any return movement or reversal of direction of motion during any single exposure operation, the driving spring 36 does not have to be made excessively powerful, even for driving the shutter at high speed for minimum exposure time. The fan type blade systems or groups occupy only a small space inside the shutter housing, thus enabling a relatively large exposure aperture with a relatively small outside dimension of the shutter housing. The arrangement according to the invention is applicable to shutters having a rectangular light inlet aperture, as well as those with the conventional circular aperture.

What is claimed is:

1. A photographic shutter comprising a structure having a light aperture, two separate blade systems each having a plurality of blades movable relative to each other in fanwise arrangement, the blades of each system being mounted so that they may be spread fanwise relative to each other to close said aperture and may be collapsed relative to each other to a non-obstructing position relative to said aperture, a main driving member, a driving element driven by said main driving member, and intermediate means operatively interposed between said driving element and said two blade systems for operating one of said blade systems during an earlier part of an operating movement of said element and for operating the other of said blade systems during a later part of an operating movement of said element, characterized by the features that:
   a. said intermediate means comprises two levers, one for each blade system,
   b. each lever is pivotally mounted near one end,
   c. each lever has near its other end a first entraining means in engagement with operating means in the respective blades of its associated blade system,
   d. each lever has at an intermediate point a second entraining means in engagement with operating means in said driving element,
   e. the respective blades of one blade system being substantially duplicates of the respective blades of the other blade system but arranged reversely with respect thereto, and
   f. said driving element moves symmetrically from a first extreme position through a central position to a second extreme position during one exposure cycle and in the opposite direction from the second extreme position through the central position to the first extreme position during the next exposure cycle,
   g. the two blade systems alternating their functions during successive exposures, so that the blade system which constitutes the opening blades of a first exposure serves as the closing blades of the next succeeding exposure and the blade system which constitutes the closing blades of the first exposure serves as the opening blades of the next succeeding exposure.

2. A shutter as defined in claim 1, further characterized by the features that the main driving member (26) is in the form of a crank and has a crank pin (26a) which engages in a driving slot (22b) in said driving element (22).

3. A shutter as defined in claim 1, further characterized by the features that said light aperture (10a) is substantially circular, and that said driving element is in the form of a ring (22) mounted for rotation around said aperture.

4. A shutter as defined in claim 1, further characterized by the features that each blade system comprises three shutter blades mounted for pivotal movement about a common bearing pin (12), and that one of the blades (14a and 16a) of each system has an opening and closing edge (14aa and 16aa) and the other blades of the same system serve as protecting blades (14b, 14c, and 16b, 16c) covering that part of the light aperture which is not covered by the blade which has the opening and closing edge, when the respective blade system is in aperture-closing position.

5. A shutter as defined in claim 1, wherein the operating means in said driving element is in the form of a first and a second slot, each slot having a dwell portion and a cam-rise portion, said portions being so arranged that during an early part of a single operating movement of said driving element in one direction from one limit position to another limit position, the cam rise portion of a first slot will operate said intermediate means to open the previously closed blades of a first blade system while the dwell portion of the other slot will control said intermediate means to maintain the blades of the other blade system in open condition, and during a later part of said single operating movement of said driving element, the dwell portion of said first slot will control said intermediate means to maintain the blades of said first blade system in open condition while the cam rise portion of the other slot will operate said intermediate means to close the previously open blades of the other blade system.

6. A shutter as defined in claim 1, wherein said main driving member is a rotary member turning always in the same direction and rotating through one-half of a revolution during each exposure cycle, and wherein during a first exposure cycle the half revolution of said main driving member moves said driving element in one direction from a first limit position to a second limit position to cause said driving element to open the blades of a first previously closed blade system and to close the blades of a second previously open blade system, and during the next exposure cycle the half revolution of said main driving member moves said driving element in an opposite direction from its said second limit position to its said first limit position to cause said driving element to open the blades of said second blade system and to close the blades of said first blade system.

7. A shutter as defined in claim 5, wherein said first entraining means on each lever is a control pin; said operating means in the respective blades are slots with which the respective control pins are engaged; and said second entraining means on each lever is an operating pin engaging the coordinated slot in said driving element.

* * * * *

UNITED STATES PATENT OFFICE
CERTIFICATE OF CORRECTION

Patent No. 3,683,778　　　　　　　　Dated August 15, 1972

Inventor(s) Hugo Weiss

It is certified that error appears in the above-identified patent and that said Letters Patent are hereby corrected as shown below:

On the cover sheet insert -- [73] Assignee

Compur-Werk Gesellschaft mit beschrankter Haftung & Co.,

Munchen, Germany --.

Signed and sealed this 19th day of December 1972.

(SEAL)
Attest:

EDWARD M. FLETCHER, JR.　　　　　　ROBERT GOTTSCHALK
Attesting Officer　　　　　　　　　　Commissioner of Patents